(12) United States Patent
Hong

(10) Patent No.: US 11,457,747 B2
(45) Date of Patent: Oct. 4, 2022

(54) CONNECTING STRUCTURE OF SUPPORT RODS OF BEDSTEAD

(71) Applicant: Xiamen Kangruiqing Furniture Co., Ltd., Xiamen (CN)

(72) Inventor: Wenyuan Hong, Xiamen (CN)

(73) Assignee: XIAMEN KANGRUIQING FURNITURE CO., LTD., Xiamen (CN)

( * ) Notice: Subject to any disclaimer, the term of this patent is extended or adjusted under 35 U.S.C. 154(b) by 0 days.

(21) Appl. No.: 17/170,906

(22) Filed: Feb. 9, 2021

(65) Prior Publication Data

US 2022/0125211 A1    Apr. 28, 2022

(30) Foreign Application Priority Data

Oct. 28, 2020   (CN) .......................... 202022437614.X (51) Int. Cl.
*A47C 19/00* (2006.01)
*F16B 12/54* (2006.01)

(52) U.S. Cl.
CPC ............ *A47C 19/005* (2013.01); *F16B 12/54* (2013.01)

(58) Field of Classification Search
CPC ... A47C 19/005; A47C 19/021; A47C 19/025; A47C 19/027; F16B 12/54; F16B 12/56; F16B 12/38; F16B 12/26
See application file for complete search history.

(56) References Cited

U.S. PATENT DOCUMENTS

| | | | | |
|---|---|---|---|---|
| 3,683,429 | A * | 8/1972 | Mis ...................... | A47C 19/024 5/300 |
| 2003/0074737 | A1* | 4/2003 | Leng .................... | A47C 19/025 5/659 |
| 2014/0208506 | A1* | 7/2014 | Bartelsmeyer ....... | A47C 19/005 5/400 |
| 2014/0338125 | A1* | 11/2014 | Polevoy ............... | A47C 19/005 5/400 |
| 2018/0344040 | A1* | 12/2018 | Lee ....................... | A47C 19/024 |
| 2018/0372138 | A1* | 12/2018 | Li .......................... | A47C 19/20 |
| 2020/0345148 | A1* | 11/2020 | Qiu ...................... | A47C 19/005 |
| 2020/0375367 | A1* | 12/2020 | Qiu ...................... | A47C 19/005 |

FOREIGN PATENT DOCUMENTS

KR    102086741 B1 *    3/2020    ............. F16B 12/56

* cited by examiner

*Primary Examiner* — Peter M. Cuomo
*Assistant Examiner* — Alison N Labarge
(74) *Attorney, Agent, or Firm* — Leong C. Lei (57) ABSTRACT

A connecting structure of support rods of a bedstead is disclosed. The bedstead includes a bed frame. The bed frame includes support rods arranged and connected between two lateral frame rods. The two lateral frame rods each have a plurality of slots. A positioning block is insertedly connected to each slot. The positioning block includes a positioning groove block. The positioning groove block has first positioning portions therein. Two sides of either end of each support rod are formed with positioning openings for the first positioning portions to be engaged therein. The support rods are easily and quickly connected to the bed frame, and the connection and support is stable.

5 Claims, 10 Drawing Sheets

CONNECTING STRUCTURE OF SUPPORT RODS OF BEDSTEAD

BACKGROUND OF THE INVENTION

1. Field of the Invention

The present invention relates to a bedstead, and more particularly to a connecting structure of support rods of a bedstead.

2. Description of the Prior Art

A bedstead generally includes a bed frame and bed feet. The bed frame generally includes two lateral frame rods and two cross frame rods to form a rectangular bed frame, or two ends of the two lateral frame rods are directly connected to a headboard and a footboard, respectively. Support rods or bed slates are disposed at the middle of the bed frame, that is, between the two lateral frame rods to form the support for the bed board or the mattress.

When the support rods are arranged and mounted at the middle of the bed frame, in order to position the support rods, a fixing structure is provided on the inner side of each lateral frame rod to prevent the support rods from moving, or the support rods are fixed one by one. This requires additional installation procedures. The fixing structure on the inner side of each lateral frame rod generally includes multiple positioning grooves arranged on the inner side of each lateral frame rod. Both ends of each support rod are directly inserted into the positioning grooves. Since the support rod is secured to the positioning grooves, it is easy to loosen, causing the support rod to shake. This will cause the problem of unstable support.

SUMMARY OF THE INVENTION

The primary object of the present invention is to provide a connecting structure of support rods of a bedstead, which enables the support rods at the middle of the bedstead to be easily and quickly connected to the bed frame, and the connection and support is stable.

In order to achieve the above object, the present invention adopts the following technical solutions:

The present invention provides a connecting structure of support rods of a bedstead. The bedstead includes a bed frame. The bed frame includes the support rods arranged and connected between two lateral frame rods. Each of the two lateral frame rods is formed with a plurality of slots arranged along its length direction. The support rods are square rods. A positioning block is insertedly connected to each slot. The positioning block includes a positioning groove block for positioning either end of each support rod to be inserted in a top-down direction. The positioning groove block includes a bottom plate and three side plates. Inner surfaces of two opposing side plates of the side plates of the positioning groove block are provided with first positioning portions, two sides of either end of each support rod are formed with positioning openings for the first positioning portions to be engaged therein.

Preferably, the lateral frame rods are square rods. Each slot forms a notch on an upper, inner corner of the lateral frame rod. The positioning block is inserted in the notch. The notch includes an upper opening formed on an upper side of the lateral frame rod and a side opening extending toward an inner side of the lateral frame rod.

Preferably, top edges of the three side plates protrude outwardly to form blocking edges to be placed onto the upper opening.

Preferably, the positioning groove block further includes a plug-in portion extending downwardly and located beneath the bottom plate. The plug-in portion is inserted into the slot in the top-down direction. The bottom plate of the positioning groove block is mounted above the side opening. The plug-in portion is blocked in the inner side of the lateral frame rod.

Preferably, the three side plates of the positioning groove block are inserted in the upper opening in the top-down direction. Outer surfaces of the three side plates are provided with at least one second positioning portion to be blocked under the upper side of the lateral frame rod.

Preferably, each first positioning portion is an oblique plate that is gradually inclined and enlarged downwardly.

Preferably, the second positioning portion is an oblique plate that is gradually inclined and enlarged upwardly.

With the above structure, when the support rods of the bed frame are to be connected and secured, the positioning block is inserted in each slot of the lateral frame rod. When either end of the support rod is inserted downwardly into the positioning groove block, the first positioning portions are engaged and positioned in the positioning openings of the support rod, so as to secure the support rod and to prevent the support rod from moving or shaking. Therefore, the support rods can be easily and quickly connected to the bed frame, and the connection and support is stable.

DETAILED DESCRIPTION OF THE PREFERRED EMBODIMENTS

Embodiments of the present invention will now be described, by way of example only, with reference to the accompanying drawings.

Figure 1:
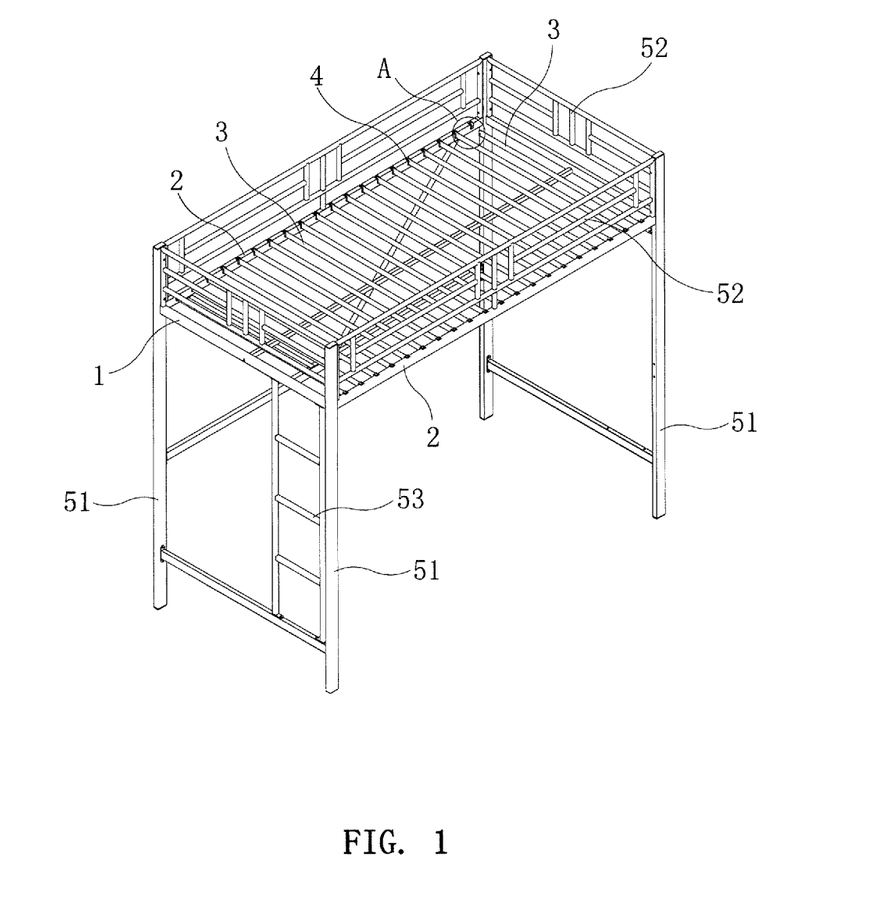
FIG. 1 is a perspective view of the present invention applied to a combined bed (with the support rods)
Figure 1A:
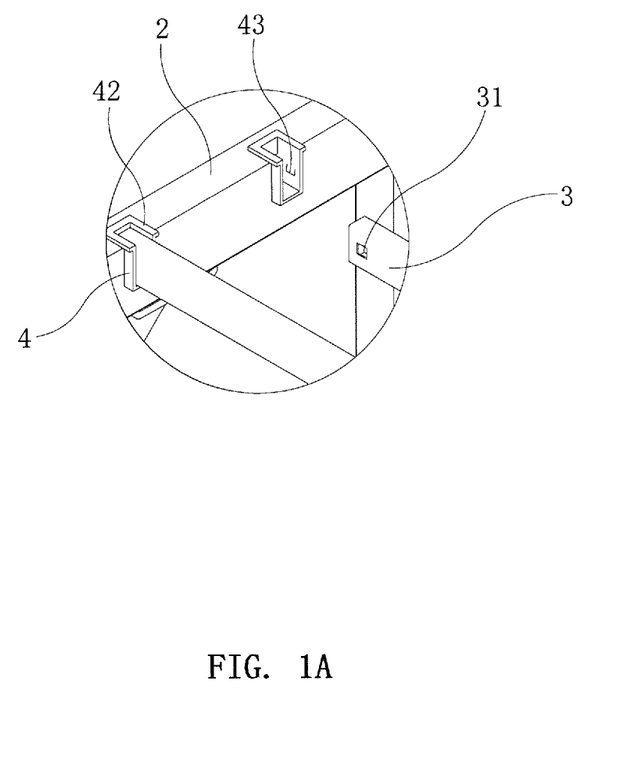
FIG. 1A is a partial enlarged view of circle A of FIG. 1.
Figure 2:
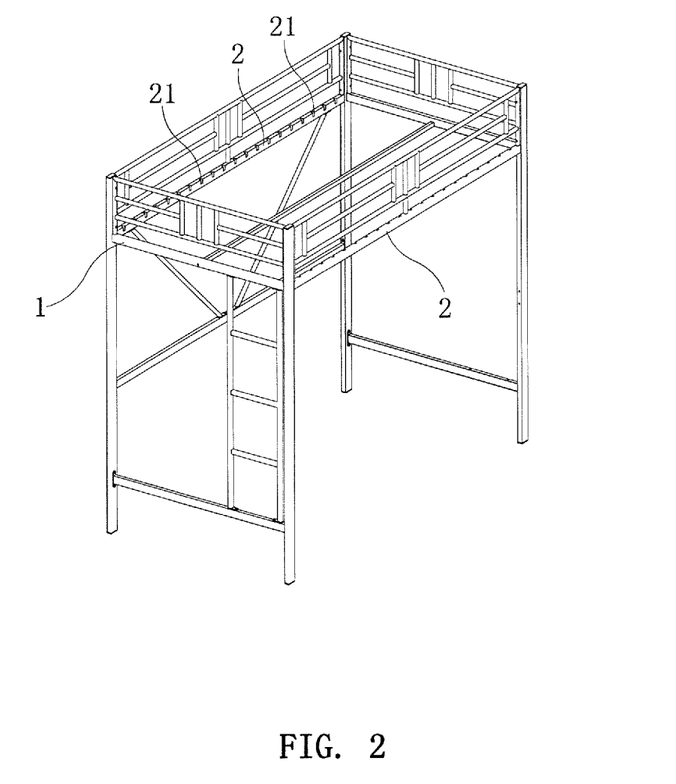
FIG. 2 is a perspective view of the present invention applied to a combined bed (without the support rods)
Figure 3:
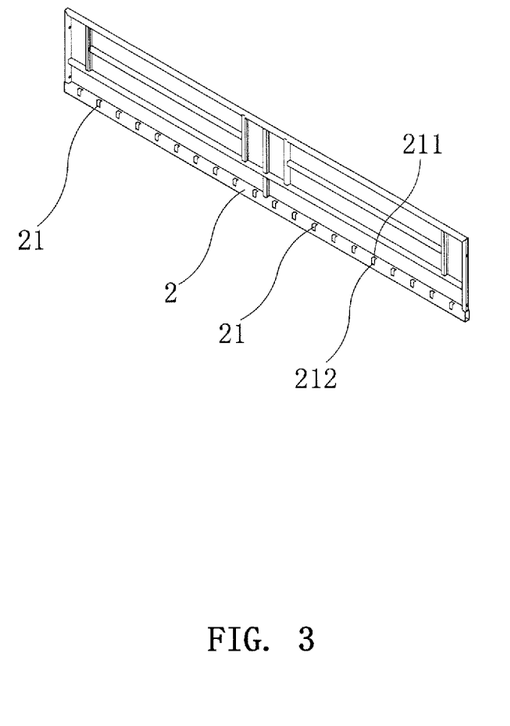
FIG. 3 is a perspective view of one of the lateral frame rods in FIG. 2.
Figure 4:
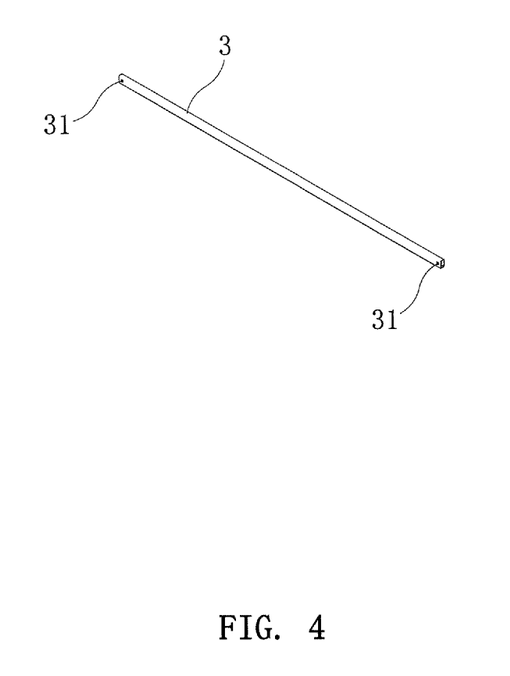
FIG. 4 is a perspective view of the support rod of the present invention.

The present invention discloses a connecting structure of support rods of a bedstead. The bedstead usually includes a bed frame. The bed frame includes a plurality of support rods arranged and connected between two lateral frame rods. As an example, a combined bed as shown in FIG. 1 includes an iron bedstead at the upper part of the combined bed. The bed frame includes two cross frame rods 1 and two lateral frame rods 2. A plurality of support rods 3 are arranged and connected to the bed frame for supporting a bed board or a mattress, etc. The support rods 3 are located between the two lateral frame rods 2. The bed frame is connected with bed feet 51. The bed feet 51 in this embodiment are four upright poles. Since the bed frame is located at the upper part of the combined bed, a guard rail 52 is provided on the outer side of the bed frame, and a ladder 53 is provided on one side of the combined bed. As shown in FIGS. 1 to 7, a plurality of support rods 3 are arranged and connected to the bed frame. In the present invention, for installing and positioning the support rods 3, the two lateral frame rods 2 each are formed with a plurality of slots 21 arranged along its length direction. A positioning block 4 is insertedly connected to each slot 21. The positioning block 4 includes a positioning groove block 41 for positioning either end of each support rod 3 to be inserted in a top-down direction, so that the support rod 3 is directly inserted and secured between the two lateral frame rods 2.

Figure 5:
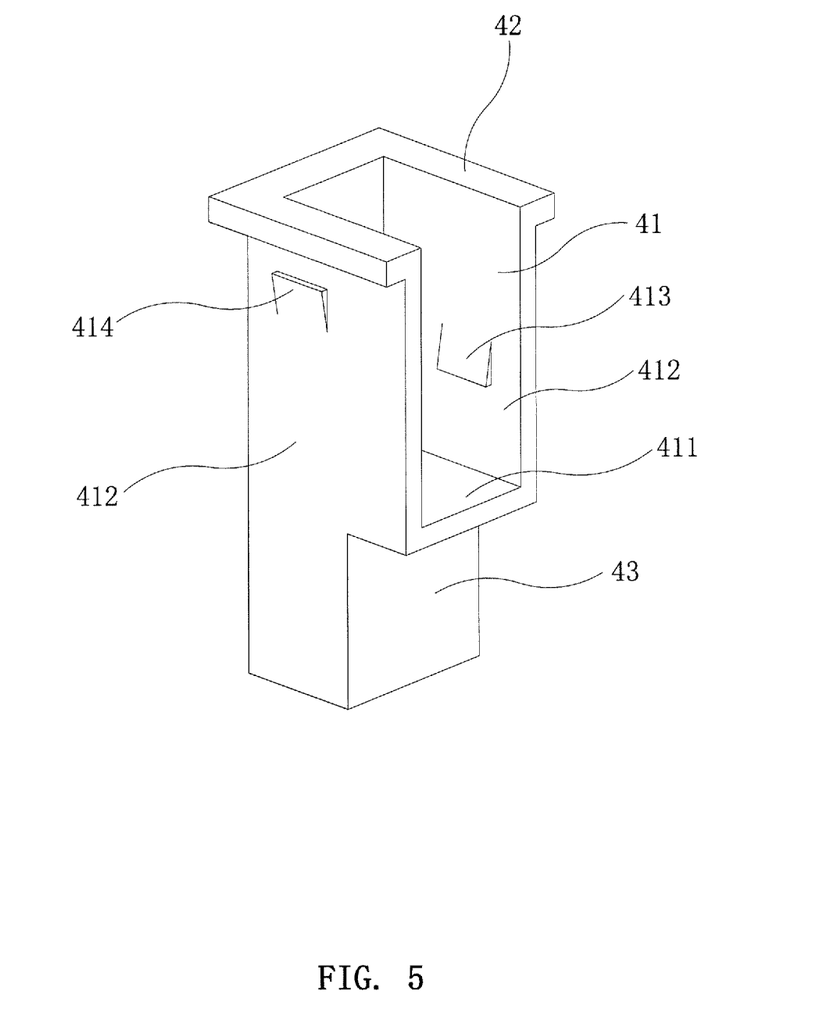
FIGS. 5-7 are perspective views of the positioning block of the present invention.
Figure 7:
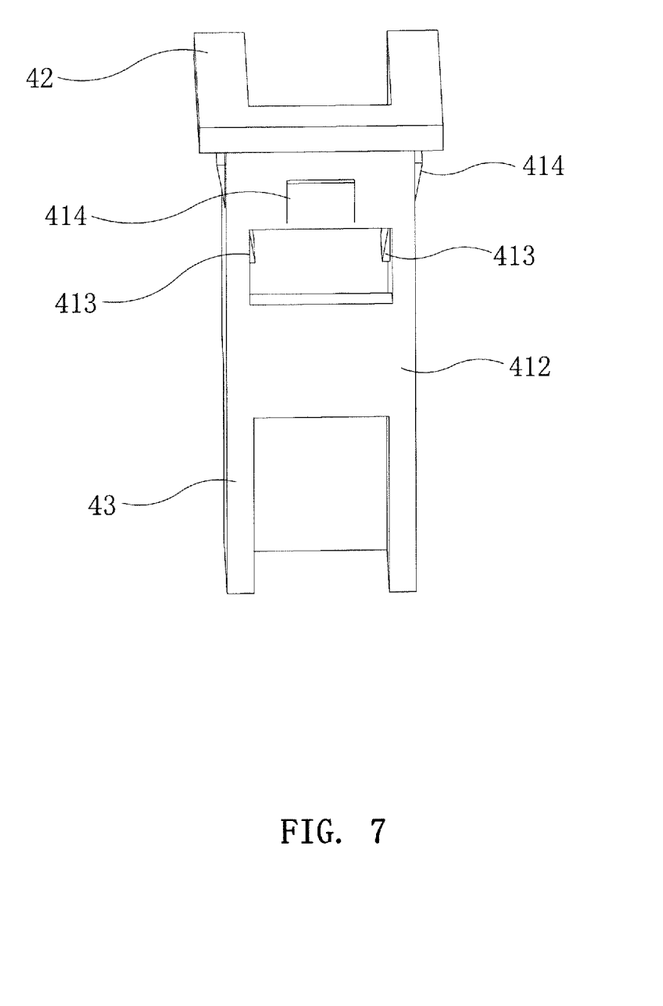

Specifically, the lateral frame rods 2 are square rods. The slots 21 of the two lateral frame rods 2 are arranged in pairs. Each slot 21 forms a notch on the upper, inner corner of the lateral frame rod 2. The positioning block 4 is inserted in the notch. The notch includes an upper opening 211 formed on the upper side of the lateral frame rod 2 and a side opening 212 extending toward the inner side of the lateral frame rod 2. The positioning groove block 41 includes a bottom plate 411 and three side plates 412 for insertion of either end of the support rod 3. The inner surfaces of two opposing side plates 412 of the positioning groove block 41 are provided with first positioning portions 413. The two first positioning portions 413 may be symmetrical. In addition, the support rods 3 are square rods. Two sides of either end of each support rod 3 are formed with positioning openings 31 for the first positioning portions 413 to be engaged therein. The first positioning portion 413 is in the form of an elastic plate or raised stopper. As shown in FIG. 5 and FIG. 7, the first positioning portion 413 protrudes downwardly. The first positioning portion 413 may be an oblique plate that is gradually inclined and enlarged downwardly and is formed on the side plate. When either end of the support rod 3 is inserted into the positioning groove block 41 in the top-down direction, the first positioning portions 413 are engaged in the positioning openings 31 to position the support rod 3. Thus, the end of the inserted support rod 3 is not easy to be loose or shaken, and the support is more stable.

Figure 6:
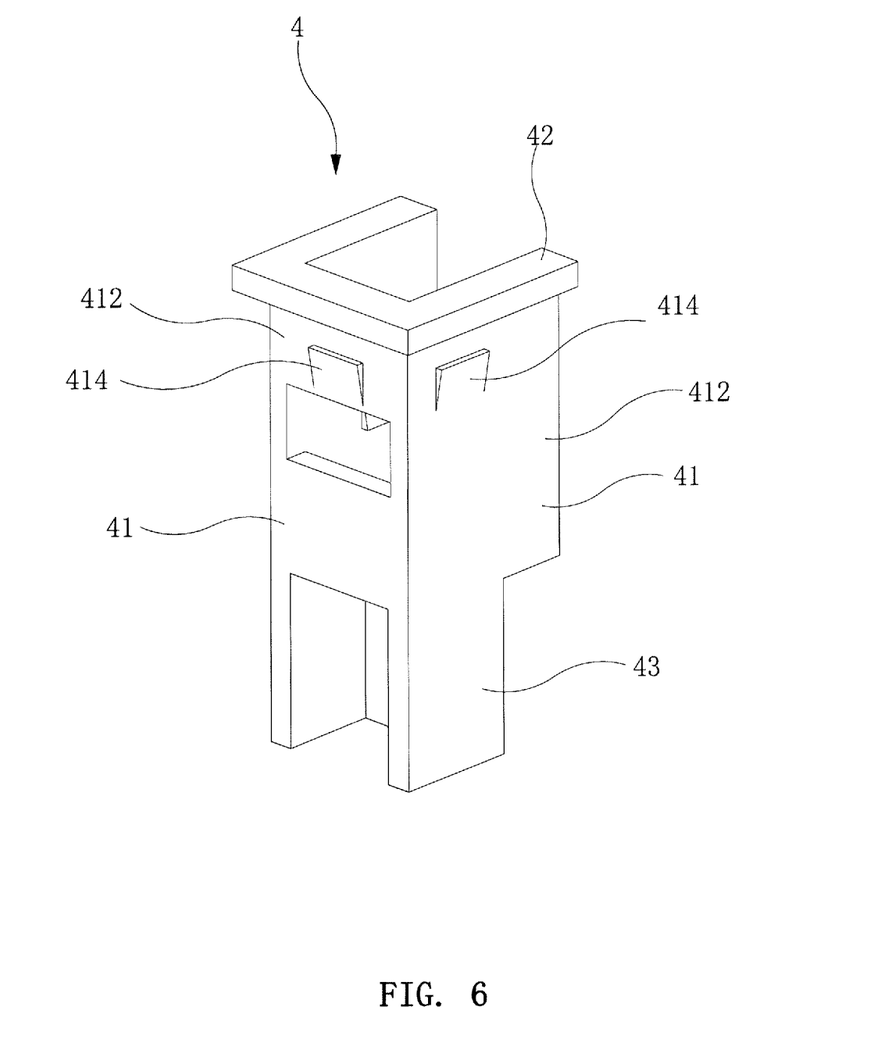

For the insertion and placement of the positioning block 4, the top edges of the three side plates 412 protrude outwardly to form blocking edges 42 that can be placed onto the upper opening 211. The blocking edges 42 enable the positioning block 4 to be positioned on the upper side of the lateral frame rod 2 when the positioning block 4 is inserted in the slot 21. The positioning groove block 41 further includes a plug-in portion 43 extending downwardly and located beneath the bottom plate 411. The plug-in portion 43 is inserted into the slot 21 in the top-down direction. The bottom plate 411 of the positioning groove block 41 is mounted above the side opening 212. The plug-in portion 43 is blocked in the inner side of the lateral frame rod 2 to prevent the positioning block 4 from moving out of the slot 21. At the same time, the three side plates 412 of the positioning groove block 41 are inserted in the top-down direction through the upper opening 211 into the slot 21. The outer surfaces of the three side plates 412 may be provided with at least one second positioning portion 414 to be blocked under the upper side of the lateral frame rod 2. In this embodiment, the second positioning portion 41 is disposed close to the upper end of the outer surface of each side plate 412. The second positioning portion 414 may be an oblique plate that is gradually inclined and enlarged upwardly and is formed on the side plate 412. Through the stop effect of the second positioning portion 414, the stop effect and the frictional force are improved, thereby preventing the positioning block 4 from moving upwardly from the slot 21.

When the present invention is installed and used, the combined bed is installed. After the bed frame is assembled, when the support rods 3 are to be installed and positioned, the positioning blocks 4 are inserted into the slots 21 of the lateral frame rods 2 in turn. After the positioning blocks 4 are secured, the respective two ends of the support rods 3 are inserted and secured into the positioning groove blocks 41 of the positioning blocks 4 in turn. Since the support rod 3 is a square rod, it is not easy to rotate. In addition, when either end of the support rod 3 is inserted downwardly into the positioning groove block 41, the first positioning portions 413 are engaged and positioned in the positioning openings 31 of the support rod 3, so as to secure the support rod 3 and to prevent the support rod 3 from moving or shaking. Therefore, the support rods can be easily and quickly connected to the bed fame, and the connection and support is stable.

Figure 8:
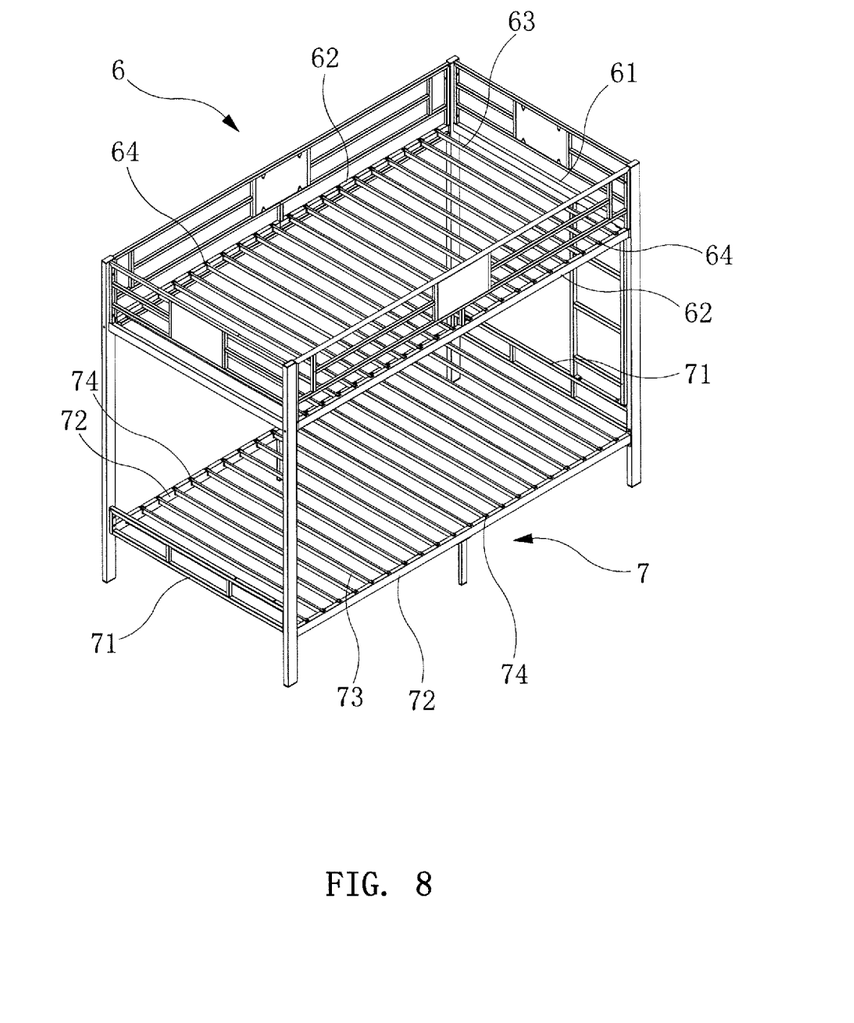
FIG. 8 is a perspective view of the present invention applied to a bunk bed frame.

The bed frame may be a bunk bed frame as shown in FIG. 8. The bunk bed frame includes an upper bed frame 6 and a lower bed frame 7. The upper bed frame 6 and the lower bed frame 7 each include two cross frame rods 61, 71 and two lateral frame rods 62, 72. A plurality of support rods 63, 73 are arranged and connected to the bed frame. Each of the lateral frame rods 62, 72 is formed with a plurality of slots (not shown in the drawing) arranged along its length direction. A positioning block 64, 74 is inserted into each slot. The structure of the positioning block 64, 74 is as described in the above-mentioned embodiment, and will not be described in detail hereinafter. The support rods 63, 73 are square rods. In the present invention, through the positioning blocks fitted into the slots of the lateral frame rods and the cooperation between the positioning blocks and the ends of the support rods, the respective two ends of the support rods 63, 73 can be inserted downwardly into the positioning blocks 64, 74, so as to secure the support rods 63, 73 and to prevent the support rod 63, 73 from moving or shaking. Therefore, the support rods can be easily and quickly connected to the bed frame, and the connection and support is stable.

Figure 9:
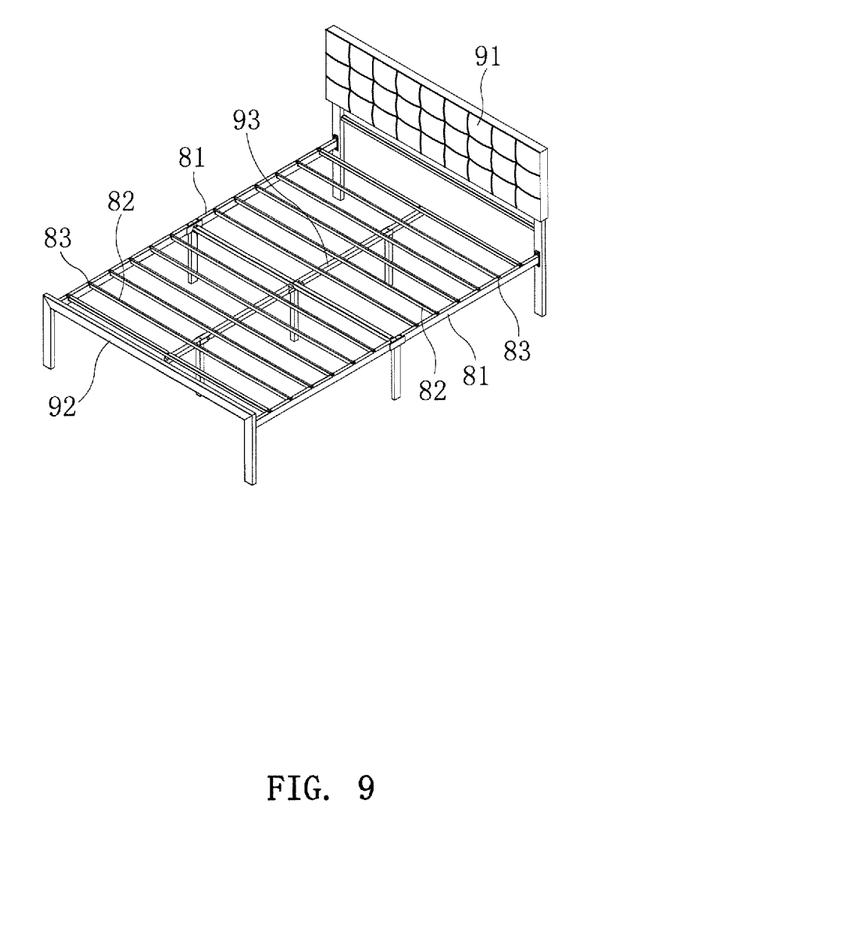
FIG. 9 is a perspective view of the present invention applied to a platform bed frame.

The bed frame may be a platform bed frame as shown in FIG. 9. The platform bed fame includes two lateral frame rods 81, a headboard 91, and a footboard 92. Two ends of the lateral frame rods 81 are connected to the headboard 91 and the footboard 92, respectively. A plurality of support rods 82 are arranged and connected between the two lateral frame rods 81 and located between the headboard 91 and the footboard 92. A middle support 93 is provided between the two lateral frame rods 81. The middle support 93 is configured to support the middle of each support rod 82 to form a support for the middle of the bed frame. Each lateral frame rod 81 is formed with a plurality of slots (not shown in the drawing) arranged along its length direction. A positioning block 83 is inserted into each slot. The structure of the positioning block 83 is as described above. The support rod 83 is a square rod. In the present invention, through the positioning blocks fitted into the slots of the lateral frame rods and the cooperation between the positioning blocks and the ends of the support rods, the two ends of the support rod 82 are inserted downwardly into the positioning blocks 83, so as to secure the support rod 82 and to prevent the support rod 82 from moving or shaking. Therefore, the support rods can be easily and quickly connected to the bed frame, and the connection and support is stable.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A connecting structure of support rods of a bedstead, the bedstead including a bed frame, the bed frame including the support rods arranged and connected between two lateral frame rods, each of the two lateral frame rods being formed with a plurality of slots arranged along its length direction, the support rods being square rods, a positioning block being insertedly connected to each slot, the positioning block including a positioning groove block for positioning either end of each support rod to be inserted in a top-down direction, the positioning groove block including a bottom plate and three side plates, inner surfaces of two opposing side plates of the side plates of the positioning groove block being provided with first positioning portions, two sides of either end of each support rod being formed with positioning openings for the first positioning portions to be engaged therein; wherein the lateral frame rods are square rods, each slot forms a notch on an upper, inner corner of the lateral frame rod, the positioning block is inserted in the notch, and the notch includes an upper opening formed on an upper side of the lateral frame rod and a side opening extending toward an inner side of the lateral frame rod; wherein the positioning groove block further includes a plug-in portion extending downwardly and located beneath the bottom plate, the plug-in portion is inserted into the slot in the top-down direction, the bottom plate of the positioning groove block is mounted above the side opening, and the plug-in portion is blocked in the inner side of the lateral frame rod.

2. The connecting structure of the support rods of the bedstead as claimed in claim 1, wherein top edges of the three side plates protrude outwardly to form blocking edges to be placed onto the upper opening.

3. The connecting structure of the support rods of the bedstead as claimed in claim 1, wherein the three side plates of the positioning groove block are inserted in the upper opening in the top-down direction, and outer surfaces of the three side plates are provided with at least one second positioning portion to be blocked under the upper side of the lateral frame rod.

4. The connecting structure of the support rods of the bedstead as claimed in claim 3, wherein the second positioning portion is an oblique plate that is gradually inclined and enlarged upwardly.

5. The connecting structure of the support rods of the bedstead as claimed in claim 1, wherein each first positioning portion is an oblique plate that is gradually inclined and enlarged downwardly.

* * * * *